(12) United States Patent
Evers et al.

(10) Patent No.: US 8,616,117 B2
(45) Date of Patent: Dec. 31, 2013

(54) SUBSTANCE DISPENSING SYSTEM

(75) Inventors: Lucas Alphonsus Maria Evers, Zeist (NL); Robert Willemsen, Utrecht (NL); Roeland Petrus Maria van Oirschot, Leusden (NL); Michiel Olivier Scholvinck, Arnhem (NL)

(73) Assignee: MDS Global Holding Ltd., Sliema (MT)

( * ) Notice: Subject to any disclaimer, the term of this patent is extended or adjusted under 35 U.S.C. 154(b) by 603 days.

(21) Appl. No.: 12/808,778

(22) PCT Filed: Dec. 12, 2008

(86) PCT No.: PCT/NL2008/000275
§ 371 (c)(1),
(2), (4) Date: Sep. 9, 2010

(87) PCT Pub. No.: WO2009/082198
PCT Pub. Date: Jul. 2, 2009

(65) Prior Publication Data
US 2011/0011273 A1 Jan. 20, 2011

(30) Foreign Application Priority Data

Dec. 21, 2007 (EP) .................... 07076119

(51) Int. Cl.
*A47J 31/06* (2006.01)
(52) U.S. Cl.
USPC ............................................. 99/295; 222/95
(58) Field of Classification Search
USPC ............... 99/295, 279, 280, 300, 302 R, 323; 222/95
See application file for complete search history.

(56) References Cited

U.S. PATENT DOCUMENTS

| | | | | |
|---|---|---|---|---|
| 4,808,346 A * | 2/1989 | Strenger | | 261/18.1 |
| 4,915,261 A * | 4/1990 | Strenger | | 222/92 |
| 5,918,767 A * | 7/1999 | McGill | | 222/95 |
| 6,866,163 B2 * | 3/2005 | McGill | | 222/63 |
| 7,165,488 B2 * | 1/2007 | Bragg et al. | | 99/295 |
| 7,347,138 B2 * | 3/2008 | Bragg et al. | | 99/289 R |
| 2004/0112222 A1 * | 6/2004 | Fischer | | 99/279 |
| 2005/0087255 A1 * | 4/2005 | Humphrey et al. | | 141/94 |
| 2006/0000851 A1 * | 1/2006 | Girard et al. | | 222/129.1 |

FOREIGN PATENT DOCUMENTS

| | | |
|---|---|---|
| WO | 2005/077811 A2 | 8/2005 |
| WO | 2007/025773 A2 | 3/2007 |

* cited by examiner

*Primary Examiner* — Henry Yuen
*Assistant Examiner* — John Wasaff
(74) *Attorney, Agent, or Firm* — Hoffmann & Baron, LLP

(57) ABSTRACT

A substance dispensing system comprising in combination:—a disposable container (1) filled with a portion of a substance, the container having a preformed and deformable body with a bottom (2), a peripheral wall (3) adjoining said bottom and having a top end remote from said bottom, an integral circumferential rim (4) extending outwards from the top end of the peripheral wall and defining a filling opening of said container, said disposable container being closed by a cover sheet (5) which is sealed to the circumferential rim by means of a circumferential seal (6), and—a dispensing apparatus (30) comprising a compression device having a cover sheet side support member (15) for the cover sheet side of the container as well as a bottom engaging member (20) for engaging on the bottom of the container, said compression device being adapted to compress the container by reduction of the distance between the cover sheet side support member and the bottom engaging member.

19 Claims, 7 Drawing Sheets

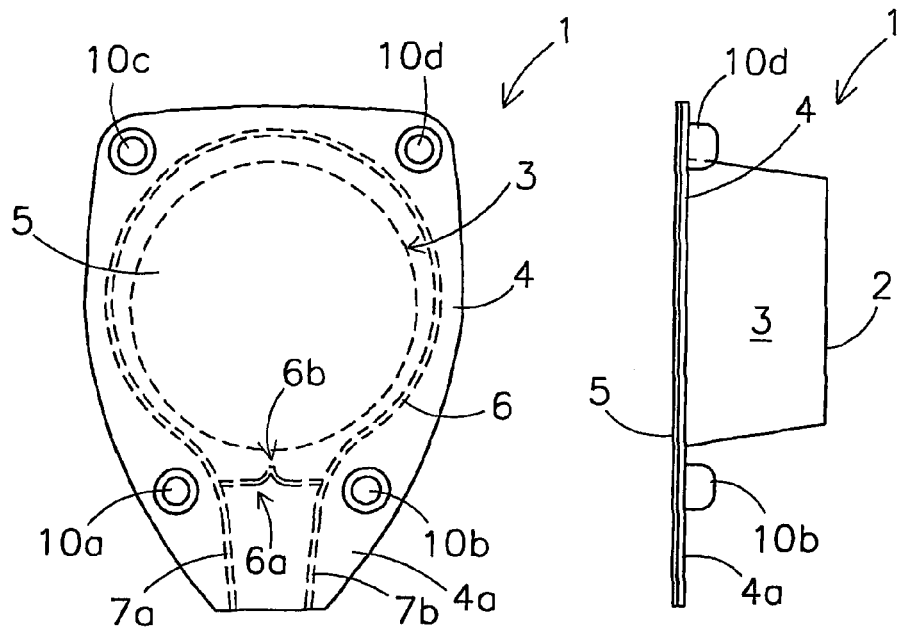
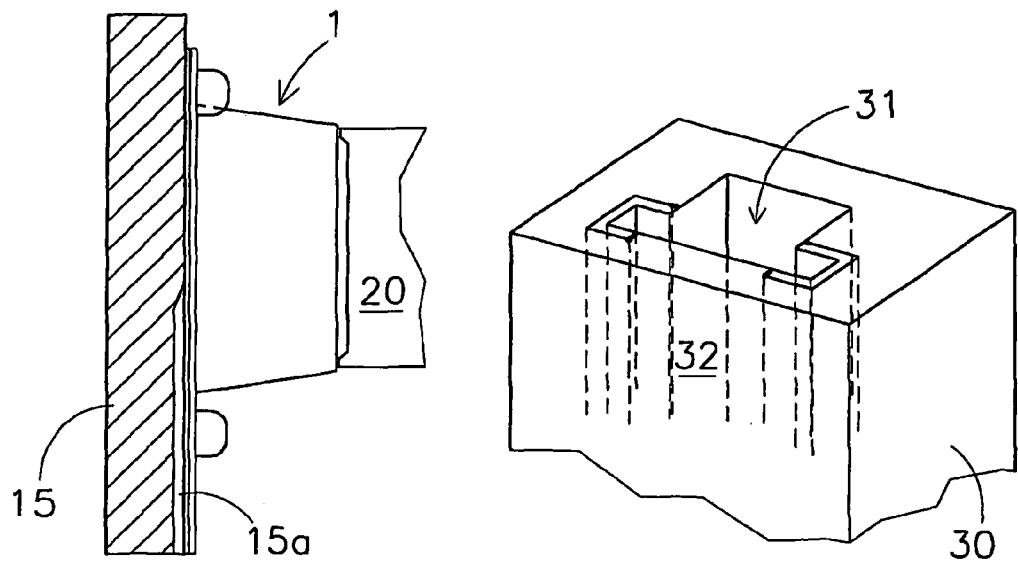

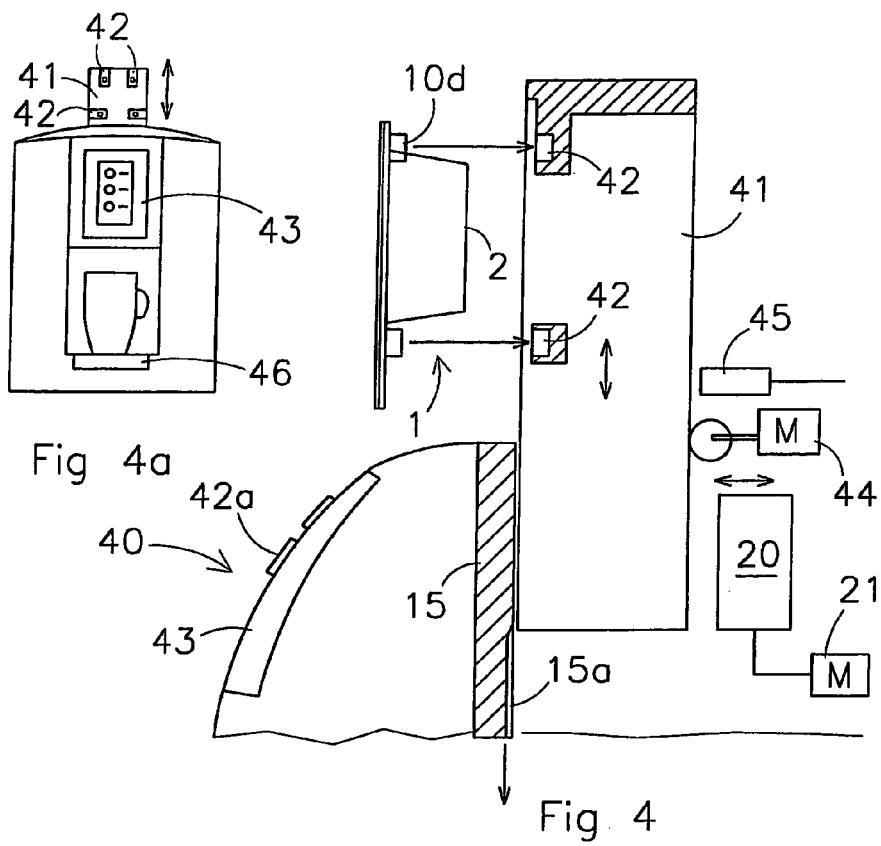
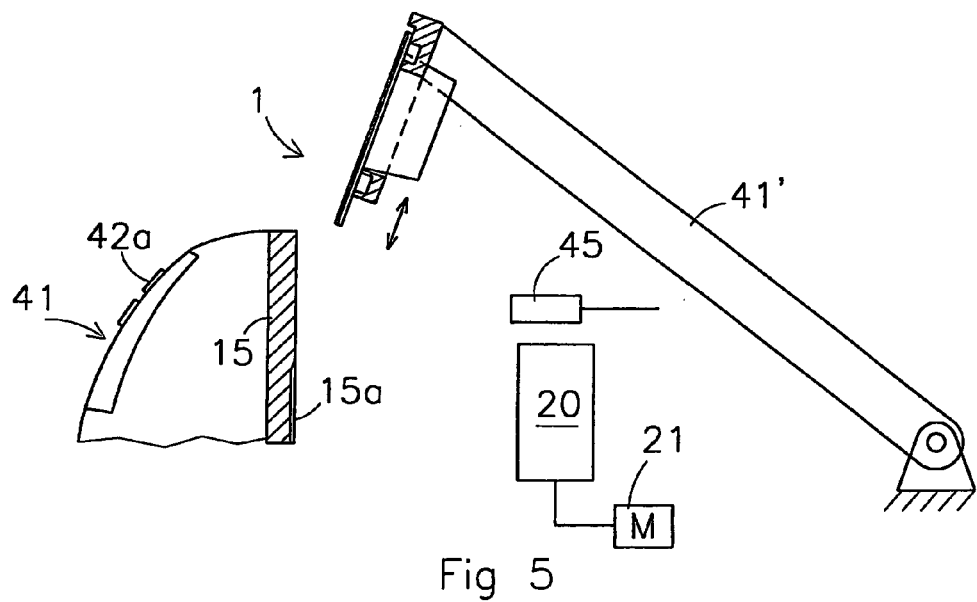

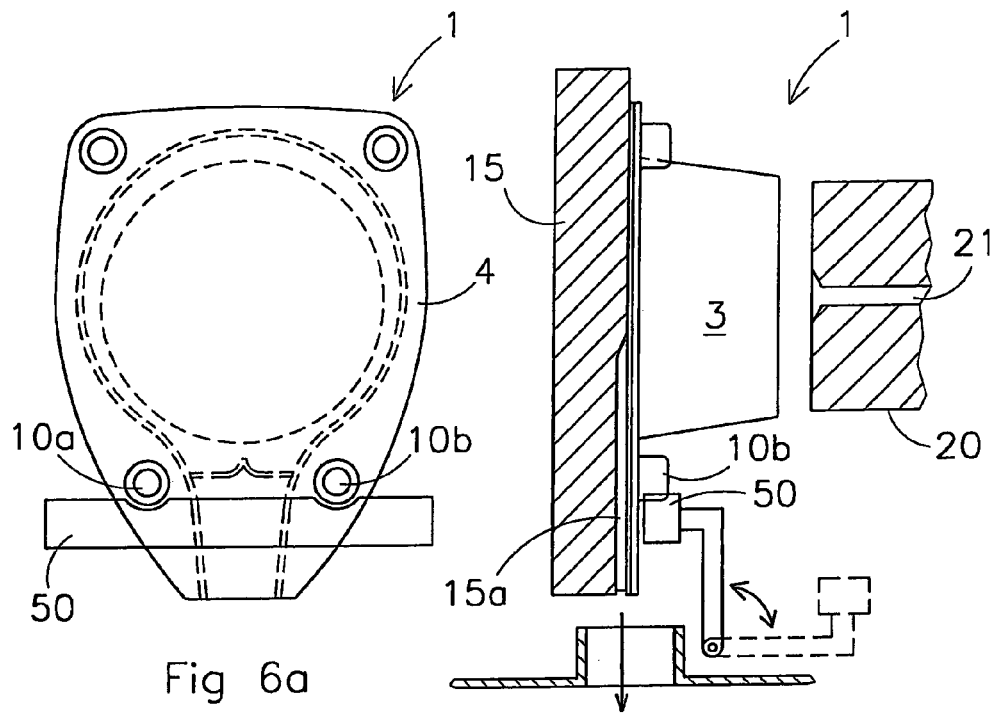
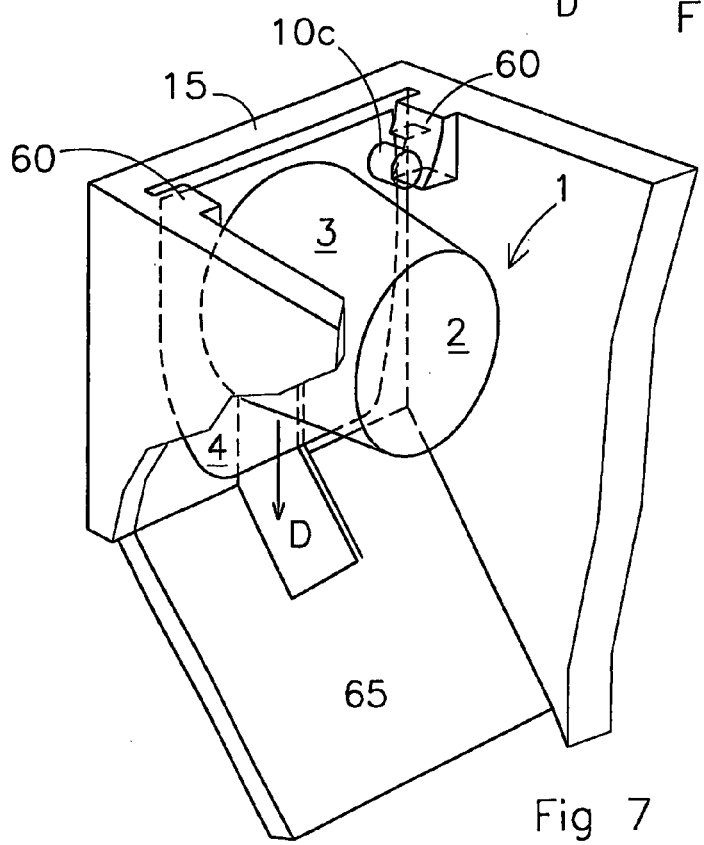

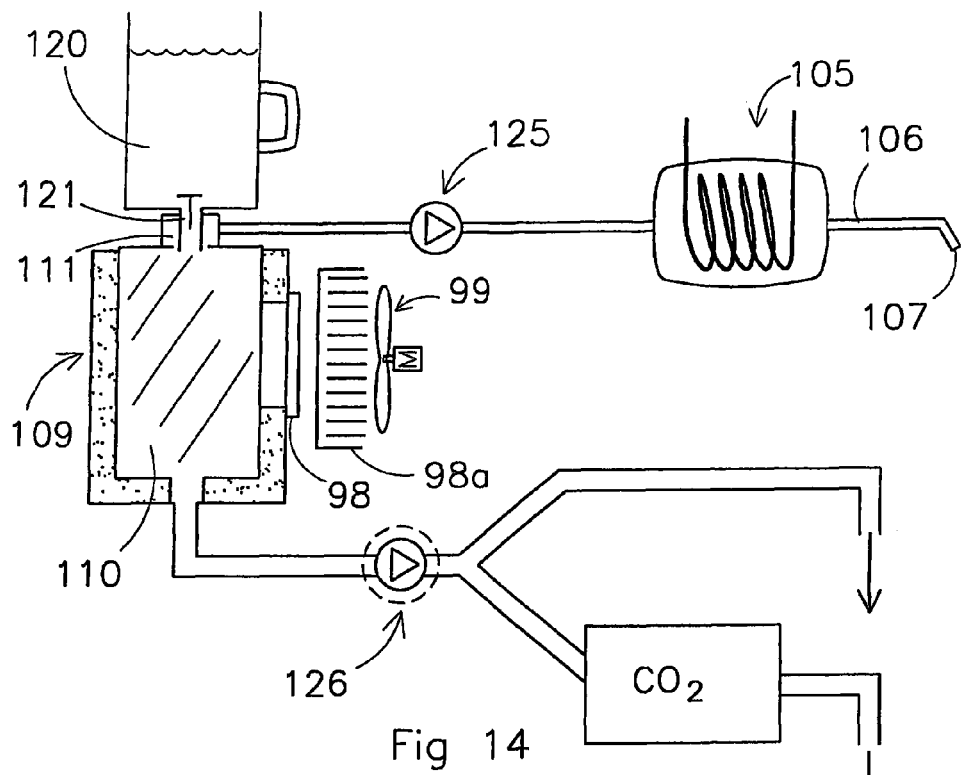
Fig 14
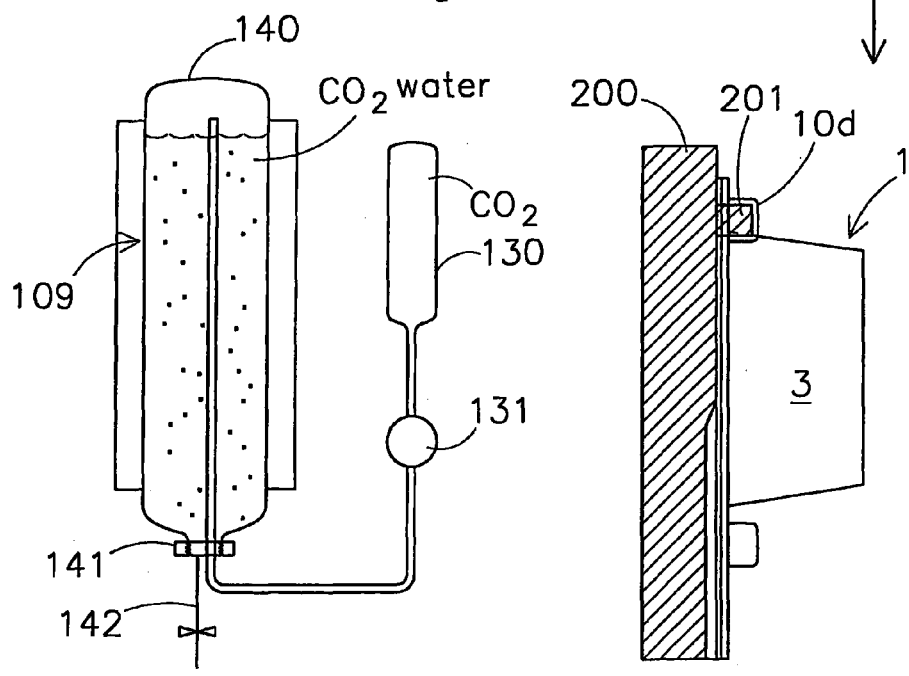
Fig 15
Fig 16

SUBSTANCE DISPENSING SYSTEM

CROSS-REFERENCE TO RELATED APPLICATIONS

This application is the National Stage of International Application No. PCT/NL2008/000275, filed Dec. 12, 2008, which claims the benefit of European Application No. EP 07076119.2, filed Dec. 21, 2007, the contents of which is incorporated by reference herein.

FIELD OF THE INVENTION

The present invention relates to a substance dispensing system.

BACKGROUND OF THE INVENTION

From WO 2007/025773 a dispensing system is known, which system includes a dispensing apparatus and disposable container filled with a portion of a substance. This known system is highly suitable as a beverage dispensing system, wherein the substance dispensed from the disposable container is mixed with water, e.g. cold or hot water, possibly carbonated water. As disclosed in said document the substance can be dispensed directly from the disposable container into a drinking receptacle, the water preferably also being dispensed directly into said receptacle.

The system also is suitable for substances that are not to be combined with water or another liquid, e.g. pharmaceutical products, food products other than for beverages, animal food products (e.g. for fish), detergents, soaps, synthetic oil products, grease, glue, etc.

SUMMARY OF THE INVENTION

The present invention aims to propose further enhancements of the known system.

For instance the invention aims to propose one or more measures that allow for a simple construction of the dispensing apparatus, preferably allowing to create a domestic dispensing apparatus.

Also the invention aims to propose one or more measures that allow for easy use of the dispensing apparatus.

Also the invention aims to propose one or more measure that allow for the combination of the substance with carbonated water, or other carbonated liquid, in an attractive manner, in particular for domestic use.

The inventive dispensing system comprises in combination:

a disposable container filled with a portion of a substance, the container having a deformable body with a bottom, a peripheral wall adjoining said bottom and having a top end remote from said bottom, an integral circumferential rim extending outwards from the top end of the peripheral wall and defining a filling opening of said container, said disposable container being closed by a cover sheet which is sealed to the circumferential rim by means of a circumferential seal, and a dispensing apparatus comprising a compression device having a cover sheet side support member for the cover sheet side of the container as well as a bottom engaging member for engaging on the bottom of the container, said compression device being adapted to compress the container by reduction of the distance between the cover sheet side support member and the bottom engaging member, wherein the cover sheet side support member has a recess therein which is arranged and dimensioned so as extend across a section of the circumferential seal, so that upon compression of the initially closed container the substance therein is pressurised causing the cover sheet to deform into the recess thereby breaking the circumferential seal at said section so that the substance is discharged from the container.

Preferably the circumferential rim is provided with one or more downward protruding rim projections, each positioned at a location outwardly spaced from the peripheral wall.

In a preferable embodiment said projections are each formed by local deformation of the rim. In a preferable embodiment the projection is a hollow boss having an opening at the topside of the rim and closed at the lower end, the cover sheet covering the open end. In a preferable embodiment the one or more projections are each cylindrical.

According to one aspect of the invention the dispensing apparatus includes one or more container guide members defining a path for the container to slide along in the apparatus, wherein the guide members are adapted to be engaged by one or more of the projections sliding along the guide members.

Preferably the dispensing apparatus has a housing with an insertion opening for a container, said guide members extending in the apparatus so as to guide the container towards the compression device, preferably based on gravity.

This aspect also envisages an embodiment wherein the dispensing apparatus has a discharge opening for compressed containers, said guide members extending in the apparatus so as to guide said compressed container from the compression device towards said discharge opening.

According to another aspect of the invention the dispensing apparatus has a mobile container receiving member, allowing a user to engage a container with said container receiving member, said receiving member then being operable so as to move said container to the compression device.

In a possible embodiment the receiving member is pivotally arranged in the dispensing apparatus. In an alternative embodiment the receiving member is linear guided in the dispensing apparatus.

In a possible embodiment the receiving member comprises one or more bores corresponding to one or more projections of the container, so as to couple the container to the receiving member by introduction of said one or more projections into said bores. For instance the receiving member has two bores adapted to receive two projections, arranged opposite the break-up section of the seal.

In a possible embodiment the apparatus has a housing and a pivotal receiving member for the disposable container at a top side of the housing, wherein the receiving member is pivotable about a horizontal axis, so as to receive the container in an upper position above the top side of the housing and allowing introduction of the container down into the housing.

The invention also relates to a system, wherein the cover sheet side support member is a stationary member of the apparatus, the apparatus being adapted to introduce the disposable container sideways between said support member and the bottom engaging member.

For instance the apparatus has an insertion opening for the disposable container which is positioned directly above the compression device allowing to introduce the disposable container in the compression device based on gravity.

The invention also relates to a system wherein the apparatus has an insertion opening for the disposable container and wherein the container is provided with identification means, preferably representing at least the substance contained in the container, so as to allow automatic identification of the container, and wherein the apparatus has identification recognition means for automatically identifying the container and preferably the substance therein, and wherein the identification recognition means are arranged at a position along the path between the insertion opening and the compression device.

The invention also relates to a system wherein the apparatus comprises a stop member that cooperates with one or more rim projections of the disposable container, which stop member is placed along or at the end of a passage for the container in the apparatus, the stop member being adapted to hold the container in a distinct position along or at the end of such a passage, for example in an end position of the passage in the compression device.

The invention also relates to a system wherein the compression device is provided with retention means engaging with one or more rim projections of the disposable container in order to retain the disposable container with respect to the cover side sheet support member, and wherein the compression device further includes a rim projection compression member for each rim projection engaged by said retention means, such that compression of said one or more rim projections causes the retention to be ceased. In a possible embodiment the one or more rim projection compression members are integral with the bottom engaging member of the compression device.

The invention also relates to a system wherein the bottom engaging member of the compression device comprises bottom retention enhancing means that enhance the retention of the bottom by said bottom engaging member allowing to take along the compressed container with the retracting bottom compression member. For instance the retention enhancing means include a suction device, e.g. a suction cup or a vacuum device.

A further aspect of the invention relates to the storage and/or pumping of (carbonated) water in the system.

In an embodiment of the system the dispensing apparatus includes at least one water pump adapted to provide a portion of water to be dispensed substantially simultaneous with the discharge of substance from the disposable container.

In a preferred embodiment the compression device and the water pump are manually operable, a common manual operating device being provided and connected to both said compression device and the water pump.

In a possible embodiment the water pump is a piston pump, a single stroke of said piston pump providing the portion of water to be combined with the substance dispensed from the disposable container.

In a possible embodiment of the system a water dispensing outlet is provided in the cover sheet side support member, in the vicinity of the recess.

In a possible embodiment the dispensing apparatus includes a cold water pump and a hot water pump, the cold water pump being associated with a cold water circuit and the hot water pump being associated with a hot water pump. In a simple embodiment the cold water pump and the hot water pump are manually operable pumps, the dispensing apparatus including a common manual operating device selectively engageable with either the hot water pump or the cold water pump.

In a possible embodiment the dispensing device includes a cold water storage unit associated with a cooling device.

In a possible embodiment the system includes a water storage container having a connector allowing the water storage container to be disconnected from the dispensing apparatus, e.g. for filling the water storage container.

In a preferred embodiment the cold water storage unit comprises a receiving chamber for receiving the water storage container.

In a possible embodiment the system includes a pressurised carbon dioxide vessel, and the water storage container is provided with a connector allowing the carbon dioxide vessel to be connected to the water storage container.

In a possible embodiment of the system the water storage container is adapted to contain pressurized carbonated water, e.g. the carbonated water is at a pressure of at least 1.1 bar. For instance the water storage container has a pressure resistant housing as well as a collapsible bag held inside said housing, said bag being in communication with the connector and adapted to receive the water.

In a possible embodiment the system has a cold water storage unit with a reservoir for storage of cold water, wherein said system includes a user refillable water storage reservoir which is detachable from the dispensing apparatus for refilling, e.g. under a tap, wherein user refillable water storage reservoir has a connector element, and wherein the dispensing apparatus is provided with a mating connector element for connection to the connector element of said user fillable water storage reservoir, said connector element of the dispensing apparatus is in communication with both the reservoir for storage of cold water—so as to fill said reservoir—and in direct communication with the hot water circuit. In a possible embodiment the cold water storage unit is both connected to the cold water circuit and the hot water circuit.

The present invention also relates to a dispensing apparatus as disclosed herein.

The present invention also relates to a method for dispensing a substance wherein use is made of the inventive system.

The different proposals are further disclosed in the appended claims and in the description of the drawings.

The present invention further relates to a beverage dispensing system comprising in combination a disposable container filled with a portion of a substance and a dispensing apparatus adapted to receive the disposable container, wherein the dispensing apparatus is adapted to cause discharge of the substance from the disposable container, the dispensing apparatus further comprising at least one water pump adapted to provide a portion of water to be dispensed.

In this alternative system the container may be embodied different from the container as generally described in claim 1, e.g. as a container to which water is fed to discharge the substance from the container. Another embodiment the substance is dispensed separately with the use of a discharge device in the apparatus, e.g. a compression device or other mechanism causing the substance to be dispensed from the disposable container.

In a preferred embodiment the discharge device and the water pump are manually operable, a common manual operating device being provided and connected to both said discharge device and the water pump. For instance the water pump is a piston pump, a single stroke of said piston pump providing the portion of water.

In a variant of the beverage dispensing system the dispensing apparatus includes a cold water pump and a hot water pump, the cold water pump being associated with a cold water circuit and the hot water pump being associated with a hot water pump. In a possible embodiment the cold water pump and the hot water pump are manually operable pumps, the dispensing apparatus including a common manual operating device selectively engageable with either the hot water pump or the cold water pump.

BRIEF DESCRIPTION OF THE DRAWINGS

FIGS. 1a, b show in plan view and in elevational view an example of a disposable container 1 for the system according to the invention, FIG. 2 shows in elevational view, partly in cross-section the disposable container of FIGS. 1a, b as well as diagrammatically indicated components of an exemplary compression device of a dispensing apparatus of the system, FIG. 3 shows a portion of the housing of an exemplary dispensing apparatus, FIG. 4 shows diagrammatically, in elevational view and partly in cross section another dispenser apparatus and a container, FIG. 4a shows diagrammatically the apparatus of FIG. 4 in front view, FIG. 5 shows diagrammatically, in elevational view and partly in cross section yet another dispenser apparatus and a container, FIGS. 6a, b show an example of a dispensing apparatus having a stop member cooperating with the one or more projections of the rim, FIG. 7 shows an example of the compression device, wherein retention means are provided that engage with one or more rim projections of the disposable container, FIG. 14 shows a further alternative for providing hot and cold water in a dispensing apparatus, in particular a beverage dispensing apparatus, FIG. 15 shows a system with a dispenser apparatus, in particular a beverage dispenser apparatus, and with a pressurised carbon dioxide vessel, FIG. 16 shows the piercing of the cover sheet by a boss of a container receiving member.

DETAILED DESCRIPTION OF THE PREFERRED EMBODIMENTS

Figure 8:
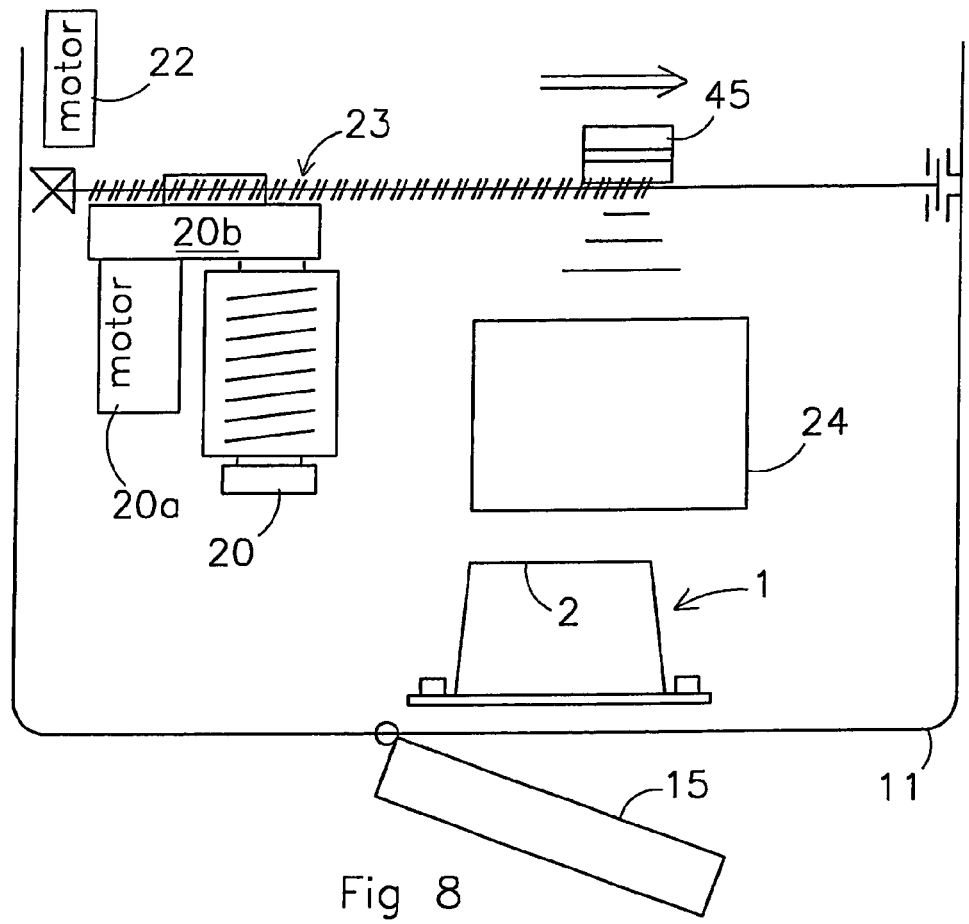
FIG. 8 shows an embodiment of the dispenser apparatus.

FIGS. 1a, b and 2 show a disposable container 1 which is filled with a portion of a substance, e.g. a beverage preparation substance.

The container 1 has a preformed and deformable plastic body with a bottom 2, a peripheral wall 3 adjoining said bottom 2 and having a top end remote from said bottom. The body has an integral planar circumferential rim 4 which extends outwards from the top end of the peripheral wall 3 and defines a filling opening of the container 1. The container 1 is closed by a cover sheet 5 which is heat-sealed to the circumferential rim 4 by means of a circumferential seal 6.

The seal 6 here has a section 6a where the seal 6 is expected to break up as the substance in the container 1 is pressurized due to compression of the container 1. This breaking up is here enhanced by a special design of the seal with a pointed centre 6b. As is known the seal 6 is extended by dispensing channel side seal sections 7a, b, which between them form a dispensing channel 9 from the seal section 6a to the outer end of the cover sheet 5 and the rim 4, here in the area of the dispensing channel 9 formed by an also planar tab portion 4a of the rim 4.

As is preferred the body of the container 1 is produced in mass production from a planar sheet, e.g. from a roll, of plastic material, which has been suitably heated and then formed, e.g. by vacuum, in a suitable mould. In this known production process a large number of bodies is formed, still attached to one another. Cutting devices the make cuts separating the bodies from one another, possibly while leaving behind breakable bridges between them. The container 1 is then filled and closed by application of the cover sheet, usually via a heat-sealing process.

As is known, and is preferred in the context of this application, the circumferential rim 4 is here provided with one or more downward (towards the bottom 2) protruding rim projections 10a-d, preferably four distributed around the peripheral wall 3, more preferably two (10a, b) at opposite sides of the dispensing channel 9 and two others (10c, d) at the side of the rim 4 remote from the discharge side. Each projection 10 here is spaced outwardly from the peripheral wall 3.

As is preferred these projections 10a-d are each formed by local deformation of the rim 4 using the vacuum forming technique, so that each projection 10a-d is a hollow boss having an opening at the topside of the rim 4 and a blind side at the lower end, the cover sheet 5 covering the open end. In a preferred embodiment each projection 10a-d is cylindrical.

FIG. 2 shows the container 1 as well as diagrammatically a cover sheet side support member 15 against which the cover sheet side of the container 1 is made to bear as a support during the compression process of the container 1.

This member 15 is part of the compression device of a dispensing device (not shown here). The compression device further includes a bottom engaging member 20, which is adapted for engaging the bottom 2 of the container 1. The compression device is adapted to compress the container 1 by reduction of the distance between the cover sheet side support member 15 and the bottom engaging member 20. As will be understood this can be done e.g. by arranging the member 15 stationary in the apparatus (at least during the compression process) and moving the member 20 towards the member 15, e.g. by a suitable electric or manual drive.

The cover sheet side support member 15 has a recess 15a therein which is arranged and dimensioned so as extend across the section 6a of the circumferential seal 6, so that upon compression of the initially closed container 1 the substance therein is pressurised causing the cover sheet 5 to deform into the recess 15a thereby breaking the circumferential seal at said section 6a so that the substance is discharged from the container via the discharge channel 9 between the cover sheet 5 and the tab 4a.

FIG. 3 shows a portion, here the top end, of the housing of an exemplary dispensing apparatus 30 having insertion opening 31 connected to a receiving passage 32 for a container 1. Preferably the container 1 is insertable with its cover sheet side 5 in vertical orientation and with the dispensing side (preferably formed by a tab 4a) in downward direction. This is suitable for containers according to claim 1, with or without the projections 10a-d being provided.

Preferably the passage 32 may lead directly to the compression device, so between the members 15 and 20.

Preferably the passage 32 is such that the container 1 passes through the passage 32 based on gravity. The passage 32 may e.g. be vertical (e.g. the compression device being arranged vertically below the insertion opening 31), but could also be inclined and/or include inclined sections towards the compression device.

The insertion opening 31 and passage 32 could also lead to the container 1 to or along an identification recognition station, where identification recognition means are arranged to identify the container 1, for example the container 1 is provided with a bar code and the identification recognition station includes a bar code reader.

As is preferred the dispensing apparatus 30 includes one or more container guide members 33 defining a path for the container 1 in the apparatus. Here these guide members 33 are adapted to be slidingly engaged by one or more of the projections 10a-d sliding along the guide members 33. Here the guide members 33 are designed to cooperate with the projections 10c, d as is preferred as their outer sides are spaced further apart than the diameter of the peripheral wall 3, so that the peripheral wall 3 will be spaced from the guide members 33.

Here the guide members 33 are C-shaped, one leg lying against the cover sheet, the opposed leg lying against the bottom side of the projections 10c, d. In another embodiment the guide members 33 could be designed to engage also on the outer sides of the projections 10c, d.

Compared to cooperation of guide members with the planar portions of the rim 4 (either portions of the outer contour thereof or of the underside) the cooperation with the one or more of these downward extending projections 10c, d has the advantage of reduced friction and improved guidance. This guidance is e.g. enhanced as the projections 10a-d are vacuum formed in a mould, causing them to have uniform dimensions.

Guidance through a passage in the dispensing apparatus based on cooperation with one or more downward projections of the rim 4 with one or more guide members (such as 33) in the apparatus has the advantage that different volume containers 1 can be accepted by the device. For instance one can envisage that different volume containers 1 are identically dimensioned in the region of the cover sheet 5 and the rim 4 (including projections 10) but have different heights of the peripheral wall 3. As the guidance is independent from said peripheral wall 3 or the bottom 4, these different volume containers 1 will all slide along the guide members.

It will be appreciated that a dispensing apparatus could have a discharge passage leading from the compression device to a discharge opening for compressed and emptied containers 1. Also this passage could be arranged to allow the container 1 to pass based on gravity.

In the event compression of the container 1 has left intact one or more of the downward projections of the rim 4, e.g. all four projections 10a-d, said one or more projections, preferably at least two of such intact projections 10c, d, could cooperate with guide members along said discharge passage for compressed and emptied containers 1. As can be seen in FIG. 2 dispensing of the substance does not require the compression of the projections 10a-d, and when these projections are remote from the peripheral wall (as is preferred) the compression of the peripheral wall 3 will not affect the integrity of the projections.

FIG. 4 shows diagrammatically, in elevational view and partly in cross section a dispenser apparatus 40 and a container 1.

The dispensing apparatus 40 has a mobile container receiving member 41 allowing a user to engage a container 1 with said container receiving member 41, said member 41 then being operable so as to move said container 1 to the compression device 15, 20.

Here the receiving member 41 is linearly guided in the apparatus, in this example in vertical direction between an upper receiving and possibly also discharge position and a lower compression position wherein the container 1 is in the compression device.

As can be seen the receiving member 41 comprises one or more bores 42 corresponding to one or more projections 10a-d of the container 1, so as to couple the container 1 to the receiving member 41 by introduction of said one or more projections 10a-d into said bores 42. As mentioned above the projections 10-d are well defined elements at well defined locations, preferably identical in this respect for different volume containers 1.

It is envisaged to provide the receiving member 41 with only two bores 42 corresponding to projections 10c, d, i.e. the bores opposite the discharge side of the container 1. The projections and bores could be designed to provide a (light) frictional fit.

Preferably the receiving member 10 is designed so as to suspend the container 1 from the bores 42, i.e. with the cover sheet in substantially vertical orientation.

In FIG. 4 it can be recognized that the cover sheet support member 15 is a stationary part of the apparatus, having no mobility whatsoever. This allows for a simple and robust construction of said member 15.

As is preferred the face of said member 15 (including the recess 15a) against which the cover sheet 5 comes to bear is substantially vertical although inclined arrangements are also possible.

The compression member 20 is movable by an associated drive means 21, e.g. an electric spindle drive means.

The receiving member 41 allows to position the container 1 therein. Then, e.g. by pushing a button 42a on a panel 43, a drive means 44 associated with the member 41 is put into action and the receiving member 41 transports the container 1 to a compression position.

As is clear the container 1 is here introduced in the compression device from above. In another arrangement the introduction is sideways with the member 41 moving in a horizontal direction.

In FIG. 4 identification recognition means 45 are shown along the path of the container when held by the receiving member 41. As explained this could be a barcode reader able to read a barcode on the bottom 2 of the container 1 and thus allow for automatic identification of the container, and in particular the substance therein.

The apparatus will dispense the substance for instance into a consumer receptacle, such as a cup or mug, preferably placed on a platform 46 of the apparatus below the container 1 in its compression position, so that the substance is directly discharged into the receptacle without any contact with the apparatus. The apparatus here also includes a water jet nozzle, allowing to direct a jet of water into the receptacle so that the substance is mixed and diluted. For instance the substance is a hot beverage extract, e.g. coffee extract, and the water is hot water.

In FIG. 5 the receiving member 41 is pivotally connected to the frame of the dispensing apparatus, here via a pivot 46 having a horizontal pivot axis. Again the member 15 is arranged stationary, the cover sheet 5 coming to bear against the member 15. As will be appreciated by the skilled person a pivot connection between the receiving member 41 and the frame of the apparatus is likely to be less expensive and less prone to wear and malfunction.

With reference to FIGS. 6a, b it will now be described that the one or more projections 10a-d of the rim 4 can also serve to cooperate with a suitable stop member 50 of the dispensing apparatus which stop member 50 is placed along or at the end of a passage for the container in the apparatus. The stop member 50 is adapted to hold the container 1 in a distinct position along or at the end of such a passage, such as in an end position of the passage in the compression device.

Here it can be seen that the stop member 50 is adapted to cooperate with the projections 10a, b at the side of the tab 4a, which is a preferred embodiment of the stop member. A passage (not shown here, e.g. as in FIG. 3) of the apparatus has guided the container from above to within the compression device, the stop member 50 thus effectively defining the end of said passage.

Here the stop member 50 is movable between an active and refracted position, the retracted position here allowing the removal of the container 1 after dispensing of the substance. In this example the stop member is pivotable with respect to the frame of the apparatus, e.g. by electric drive, so that in the inactive position (shown in dashed lines) of the stop member 50 the container 1 can be conveyed away (substantially at right angles) from the member 15, e.g. by retention on the bottom engaging member 20.

For effecting discharge of a container 1 after dispensing of the substance it can be desired that the compressed container 1 is moved along with the retracting bottom engaging member 20, e.g. towards a discharge opening or passage within the dispensing apparatus (e.g. to a waste container within the apparatus).

To obtain this effect, or to enhance it, a preferred embodiment provides that the bottom engaging member of the compression device comprises bottom retention enhancing means that enhance the retention of the bottom 2 by said member 20 allowing to take along the compressed container 1 with the retracting bottom compression member 20. This could be effected by suitable design of the member 20, e.g. with circumferential groove(s) and/or rib(s) which grip the container as it is compressed. In another embodiment a suction device could be provided, e.g. a suction cup or a vacuum device causing a vacuum that holds the bottom to the member 20. FIG. 6b shows by way of example a vacuum channel 21 (that is connected to a vacuum source (not shown)) in the member 20, terminating in a vacuum suction opening at the side engaging the bottom 2.

FIG. 7 shows an example of the compression device, having member 15 and member 20 (not shown), wherein retention means 60 are provided that engage with one or more rim projections 10a-d of the disposable container 1 in order to retain the disposable container with respect to the cover side sheet support member 15 for the compression of the container 1. It is envisaged that the compression device further includes a rim projection compression member for each rim projection engaged by said retention means, such that compression of said one or more rim projections causes the retention to be ceased. Preferably said one or more rim projection compression members are integral with the bottom engaging member 20 of the compression device.

In FIG. 7 the skilled person will recognize that the means 60 are stationary mounted so as to cooperate with the projections 10c, d when the container 1 is in its compression position. In this example it is assume that the container 1 has been brought to said position from above, e.g. directly via an insertion opening or via a suitable passage of the apparatus. The container 1 now effectively becomes suspended from said projections 10c, d in the compression position. The member 20 will then compress the container and substance discharged as shown with arrow D, through a large discharge opening of the housing of the apparatus (no contact).

As mentioned above the member 20 could be designed to have integral rim projection compression members causing the compression of these projections 10c, d. The retention means 60, here suitable configured bosses, are then so designed that they will not retain the compressed projections 10c,d, here by a suitable spacing of these means 60 from the face of member 15 (so that the compressed projections are free from said means 60).

In conjunction with compression of the projections 10c,d it is advantageous design to have a discharge chute 65 from then lower end of the compression device to a discharge opening (not shown) so that the compressed container falls into said chute 65. This happens as the member 20 is retracted.

FIG. 8 shows an embodiment of the dispenser apparatus wherein the member 15 is embodied movable, here as a hinged door of the housing 11, allowing the user to bring the member 15 in an access position, wherein the container can be brought into a space where it is held by suitable retention means, e.g. bores 42 in a stationary retention member, which bores cooperate with the projections 10a-d.

An optical identification recognition device, such as a barcode reader 45, is position in the apparatus, able to read the identification code of the bottom 2.

In this apparatus a first detail is that the member 20, its associated drive (here with motor 20a and transmission 20b) are mounted mobile in the dispensing apparatus, between retracted position (shown in FIG. 7) and an active position aligned with the container 1 and the member 15. Here a sideways mobility is shown.

This mobility allows e.g. the optical device 45 to have a "reading path to the bottom of the container" that would otherwise be hindered by the presence of the member 20 at its active position. The optical device 45 could be arranged stationary but could also be mobile, e.g. for the purpose of reading the identification (e.g. barcode).

In this example the member 20 and its associated drive are linear guided in the frame of the apparatus, here horizontally. A further drive motor 22 with transmission (here spindle 23) are provided to move said member and its associated drive. In this example optical device 45 is moved by the same spindle 23.

The mobility of member 20 and its associated drive in this example also allow for the compressed container 1 to be deposited in a waste bin 24 inside the apparatus, effectively below the member 20 during the compression stage. As will be understood this is possible when the retention means for the container 1 allow the container 1 move away from door 15 while said door 15 is still closed.

Figure 9:
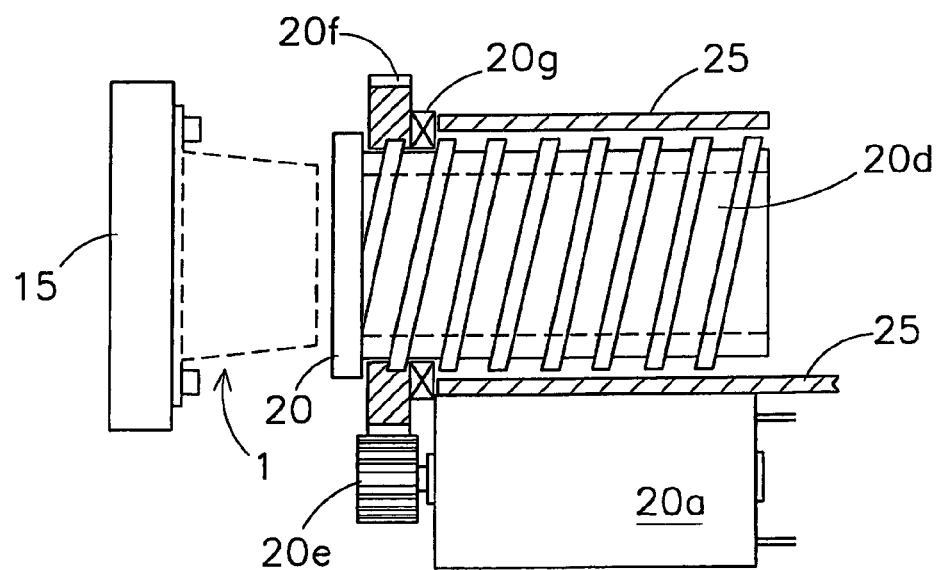
FIG. 9 shows a compact design of the bottom engaging member and its associated drive.

FIG. 9 shows a compact design of the member 20 and its associated drive with motor 20a and transmission.

The member 20 has an axial body 20d provided with screw thread (coarse), the body 20d being prevented from rotation with respect to a frame subassembly 25 by suitable means (not shown), e.g. a pin in an axial groove or elongated guide ways.

The frame subassembly 25 supports the electric motor 20a with its axis parallel to the body 20, which allows a compact design.

The rotary output shaft of the motor 20a is connected via a suitable transmission to rotatable member (here 200 having screw thread meshing with the screw thread on body 20d.

Here the body 20d is provided with external screw thread. The output shaft is provided with a pinion 20e, meshing with an annular gear 20f extending around the body 20d. The gear 20f is mounted rotatably on the frame subassembly 25 via a bearing 20g. This gear 20f is internally provided with a screw thread engaging the outer screw thread on body 20d.

It will be appreciated that the body 20d could be annular with internal screw thread, the member 20f having external screw thread and extending within the annular body.

As will be understood the motor 20*a* has two operating directions allowing the body 20*d* to be extended or retracted (corresponding to compression of the container 1 with member 20 and retraction of said member 20).

As mentioned in the introduction the dispensing apparatus could be provided to dispense a volume (a portion) of water in according with the dispensing of substance from the disposable container 1. The dispensing of water is preferably done simultaneous with the dispensing of the substance, or at least with some overlap time wise, to enhance mixing/dilution.

In known embodiments the apparatus is provided with an electric pump or two electric pumps. Such pumps are rather costly.

Figure 10:
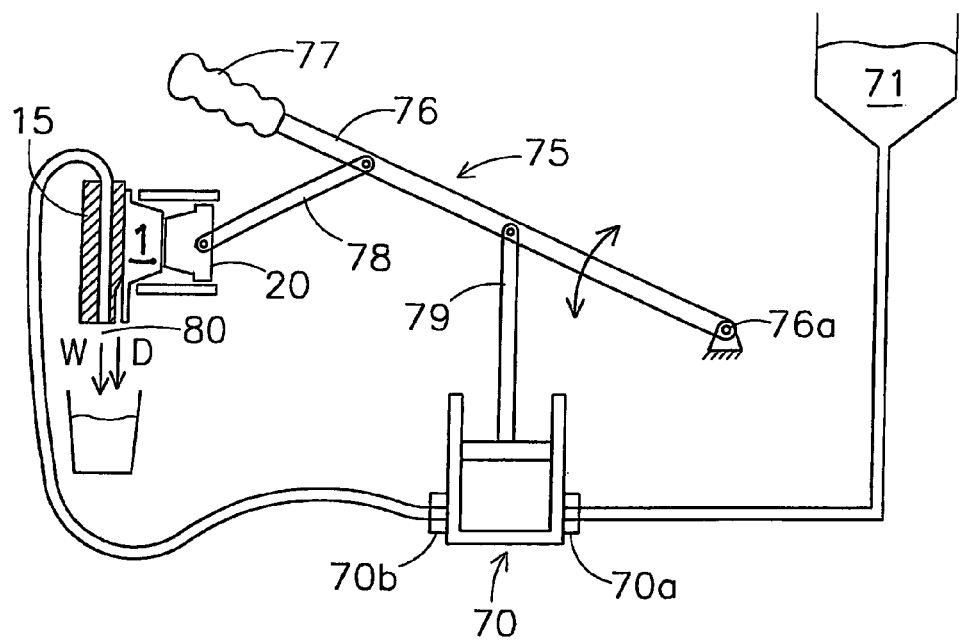
FIG. 10 shows an exemplary dispensing apparatus a compression device for the container 1 as well as a water pump.

In FIG. 10 an exemplary dispensing apparatus is shown having a compression device 15, 20 for the container 1 as well as a water pump 70. The pump 70 is connected to a water source, here schematically indicated as a reservoir 71.

In FIG. 10 both the compression device 15, 20 and the water pump 70 are manually operable. A common manual operating device 75 is provided which is connected to both said compression device 15, 20 and the water pump 70. In this simple embodiment the manual operating device 75 comprises a lever 76 with hand grip 77, which can be pivoted (preferably up and down) about a pivot 76*a*. A connecting link 78 connects the lever 76 to the member 20, whereas a connecting link 79 connects the lever 76 to the pump 70. Instead of links 78, 79 other transmissions, e.g. using chain, belt, gear, etc., could be used.

The pump 70 preferably is a piston pump, a single stroke of the piston corresponding to the desired volume of water.

The piston pump 70 is associated with an inlet valve 70*a* and an outlet valve 70*b*.

In the FIG. 10 apparatus a single lever motion by the user by hand (here down as is preferred) effects both the compression of the container 1 as the pumping of the water.

In FIG. 10 another detail to be noted is that a water dispensing outlet 80 is provided in the cover sheet side support member 15, in the vicinity of the recess 15*a*. The outlet 80 is preferably directed to provide a jet of water which "merges" with the jet of substance from the container 1, e.g. at an angle of less than 20 degrees with respect to said jet of substance.

The arrangement of the outlet 80 in the member 15 near the recess 15*a* is especially advantageous when the member 15 is arranged stationary within the apparatus, e.g. when the container is deposited from above between the member 15 and the member 20 of the compression device. The stationary arrangement of the member 15 facilitates the connection of the outlet 80 to the water pump 70 (or multiple water pumps).

The common drive of the water pump and the compression device could also be effected when the drive is not manual but by means of a single electric motor. In said arrangement a single electric motor would be connected to both the compression device and the pump, preferably so as to operate them simultaneous.

In a possible embodiment the piston pump is mounted parallel to the compression device, so that linear motions of the piston pump and the compression device can be effected with a common drive (manual or electric).

A common drive for the compression device and the water pump allows to obtain a reliable and attractive "timing" of the dispensing of substance and of water.

Figure 11:
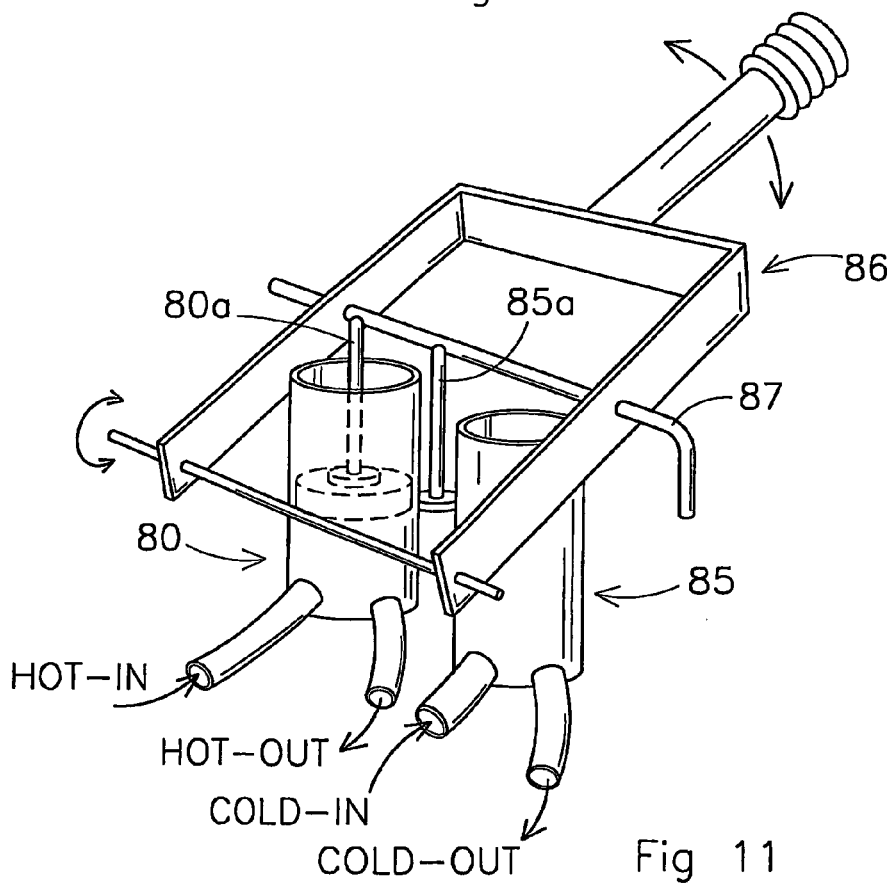
FIG. 11 shows diagrammatically a dispensing apparatus to be used in conjunction with container 1 and compression device.

FIG. 11 shows diagrammatically a dispensing apparatus to be used in conjunction with container 1 and compression device 15, 20 having a cold water pump 85 and a hot water pump 80; here both piston pumps dimension to supply a portion of water to be mixed with the substance in the container 1 when the piston makes a single stroke.

Making use of distinct pumps for cold and hot water instead of a single pump avoids that the temperature of the pump (e.g. the housing of the pump) would impair the temperature of the dispensed water.

As depicted the cold water pump 85 is associated with a cold water circuit and the hot water pump 80 is associated with a hot water circuit. This allows e.g. the use of the dispenser apparatus for the preparation of cold and hot beverages.

In FIG. 11 it is also suggested that the cold water pump 85 and the hot water pump 80 are manually operable pumps, the dispensing apparatus including a common manual operating device 86 selectively engageable with either the hot water pump or the cold water pump. In this embodiment the device 86 includes a selector 87 to select which piston rod 85*a*, 80*a* will operate its associated piston, here by sliding the piston rods sideways.

It will be understood that the piston hot and cold water pumps 80, 85 could also be operated by a common electric drive, a selector being provided to determine which pump is actually driven by the electric drive.

When having distinct cold and hot water pumps, it can be envisaged to have the housing of the cold water pump cooled by a cooling device (e.g. the same device that cools the water) and/or the housing of the hot water pump heated by a heating device (e.g. the same device that heats the water).

It will be understood that the elaborations made with regard to FIG. 11 also are applicable to other dispensing apparatuses (in particular for beverages) which are used in combination with a disposable container, wherein the container is not compressed during dispensing but e.g. a flow of (hot or cold) water is made to pass through the container entraining the substance in the container (e.g. as in the Tassimo™ product).

Figure 12:
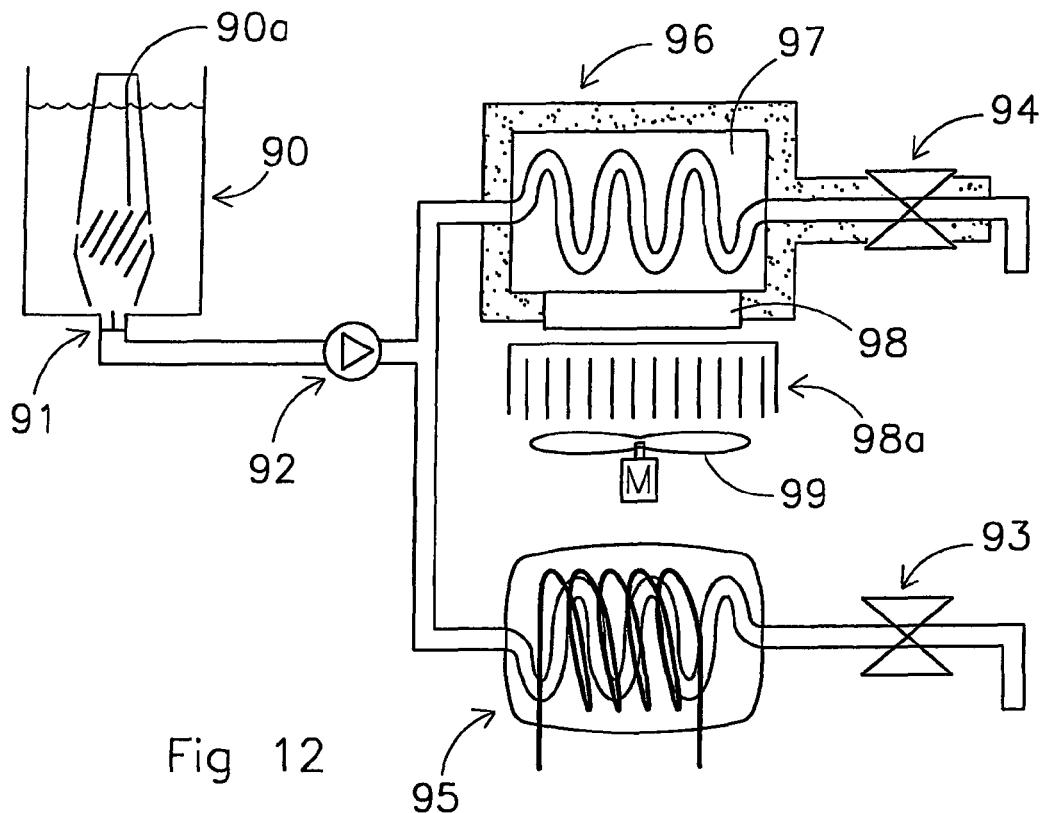
FIG. 12 shows the hot and cold water circuits of a dispensing apparatus, FIG. 13 alternative hot and cold water circuits of a dispensing apparatus.

FIG. 12 shows the hot and cold water circuits of a dispensing apparatus to be used preferably in combination with a container that is to be compressed. A water storage container 90 is shown having a connector 91 allowing the water storage container 90 to be connected to and disconnected from the dispensing apparatus. As an option the container 90 includes a filter 90*a* for the water. The container 90 can be filled by the consumer at a remote location and then connected to the apparatus. For instance the container 90 has a volume between 0.25 and 2.5 litres.

A pump, e.g. an electrical pump, 92 is provided, interconnected to both the cold and hot water circuit. The discharge of water (hot or cold) is governed by a valve 93, 94 in each circuit.

The apparatus has a hot water circuit including an electrical flow through heater 95, that heats a flow of water as it flows through the heater 95. Such heaters are well known in the art.

The apparatus also includes a flow through cooler 96 which cools the water as it flows through the cooler 96. Preferably the cooler 96 has the capacity to cool water from ambient (e.g. 20 degrees) to 5 degrees as the water is discharged, so without pre-cooling of the water. For instance the cooler 96 contains a meandering conduit within a metal block 97 (packed in insulating material), which block is cooled by a Peltier element 98. Heat from the peltier element 98 can be removed using a fan 99 and cooling ribs 98*a* on the peltier element.

Figure 13:
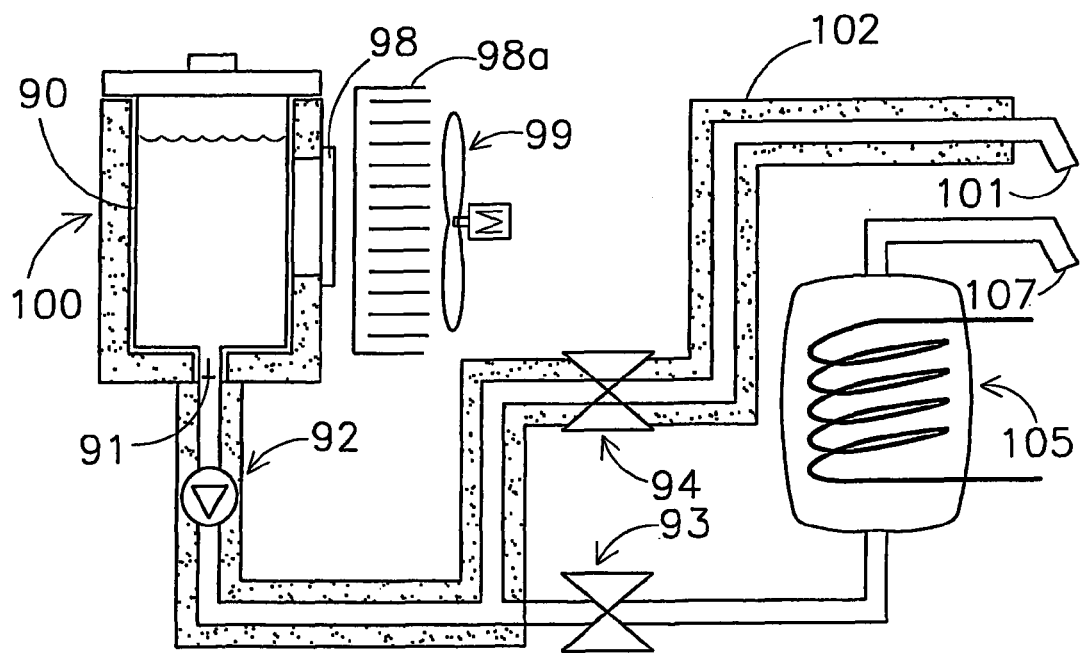

FIG. 13 shows alternative hot and cold water circuits of a dispensing apparatus to be used preferably in combination with a container that is to be compressed. Here the dispensing apparatus includes a cold water storage unit 100 associated with a cooling device 105. The cold water storage unit 100 is adapted to store water at a temperature below ambient, e.g. at a temperature between 4 and 7° C.

As is preferred between the storage unit 100 and the outlet for cold water 101 no further cooling device is present. Preferably the conduit 102 between the storage unit 100 and the outlet 101 is insulated as shown here.

It will be understood that the elaborations made with regard to FIG. 12 also are applicable to other dispensing apparatuses (in particular for beverages) which are used in combination with a disposable container, wherein the container is not compressed during dispensing but e.g. a flow of (hot or cold) water is made to pass through the container entraining the substance in the container (e.g. as in the Tassimo™ product).

The FIG. 13 shows that a water heater device 105 is provided, connected to the cold water storage 100 so that the heater device 105 is fed with cold water. Said device 105 can be an electric boiler 106 as shown here, preferably suitable to provide water at a temperature between 70 and 100° C. to hot water outlet 107.

As will be understood this arrangement of a cold water storage in combination with the heater device requires a somewhat larger capacity of the heater device as with a feed of ambient temperature water. Yet this drawback is compensated by the storage of cold water and the absence of two storages for water (one cold, one ambient).

It can be envisaged that the storage unit 100 includes a reservoir stationary in the apparatus. It is however preferred to have a user portable water storage container 90 with a connector 91 as described above, which can be placed in a receiving chamber of the cooled storage unit 100.

Preferably the user portable storage unit 90 is such that it can be filled by the user and then placed in a domestic refrigerator, e.g. the size of a milk carton (or two or three combined milk cartons), so that the water can be cooled in the refrigerator.

Preferably the storage unit 90 can be closed allowing it to be put in any orientation in a refrigerator without leaking water.

Cooling of the water, or of the receiving chamber, can be effected with a Peltier element(s), e.g. as disclosed with reference to FIG. 12.

It will be understood that the elaborations made with regard to FIG. 13 also are applicable to other dispensing apparatuses (in particular for beverages) which are used in combination with a disposable container, wherein the container is not compressed during dispensing but e.g. a flow of (hot or cold) water is made to pass through the container entraining the substance in the container (e.g. as in the Tassimo™ product).

FIG. 14 shows a further alternative for providing hot and cold water in a dispensing apparatus, in particular a beverage dispensing apparatus. Here the apparatus includes a cold water storage unit 109 which has a reservoir 110 for storage of cold water. The system further includes user portable and refillable water storage reservoir 120 which is detachable from the dispensing apparatus for refilling, e.g. under a tap.

The user refillable water storage reservoir 120 has a connector element 121, and the dispensing apparatus is provided with a mating connector element 111 for connection to the connector element 121 of the user fillable water storage reservoir 120.

As can be seen the connector element 111 of the dispensing apparatus is in communication with the reservoir 110 for storage of cold water—so as to fill said reservoir 110 from the container 120. It is also shown that the connector element 111 is in direct communication with the hot water circuit, here including water heater device 105 (here boiler) and conduit 106 leading to outlet 107. So the reservoir 120 can be filled with water at ambient temperature by the user, e.g. 1-2 litres, and then connected to the apparatus to fill the reservoir 110 (when needed) and provide a store of water that can be heated) or discharged at ambient temperature when a further ambient conduit would connect to the element 111 (e.g. upstream of the heater device 105).

Again the cold and hot water circuits can each include a distinct pump, a pump 125 for hot water and a pump 126 for cold water.

The cold water reservoir 110 could be part of a carbonator, or associated therewith to obtain carbonated cold water 126. It can also be envisaged to admix CO2 at a downstream position as indicated in FIG. 14.

In the embodiment of FIG. 15 it is envisaged to provide a system with a dispenser apparatus, in particular a beverage dispenser apparatus, and with a pressurised carbon dioxide vessel 130. Herein the water storage container 140 is pressure resistant and is provided with a connector 141 allowing the carbon dioxide vessel 130 to be connected to the water storage container 140 (with interposition of reduction valve 131). The connector 141 also allows to connect the container 140 to the water circuit 142 of the dispenser apparatus, so that carbonated water can be fed to said apparatus.

It can be envisaged that the container 140 is prefilled with carbonated water, the additional CO2 from bottle 130 both serving to expel the water from the container 140 and to maintain the carbonization of the water.

The container 140 containing carbonated water is preferably held in a cooled water storage unit, e.g. in a receiving chamber thereof Carbonated water could also be fed to the dispensing apparatus using a water storage container is adapted to contain pressurized carbonated water at a pressure of at least 1.1., preferably at least 2 bars. Such a water storage container could be designed similar to the present kegs for beer in the Beertender™ and PerfectDraft™ systems, having a pressure resistant housing (metal) as well as a collapsible bag held inside said housing, said bag being in communication with the connector and adapted to receive the carbonated water.

It will be understood that the elaborations made with regard to FIGS. 14, 15 also are applicable to other dispensing apparatuses (in particular for beverages) which are used in combination with a disposable container, wherein the container is not compressed during dispensing but e.g. a flow of (hot or cold) water is made to pass through the container entraining the substance in the container (e.g. as in the Tassimo™ product).

FIG. 16 shows a container receiving member 200 (e.g. similar to member 15) equipped with one or more retention members 201, preferably embodied as a short pin. As is shown here the container 1 has one or more projections 10*d* embodied as a hollow boss having an opening at the topside of the rim of the container and closed at the lower end, the cover sheet 5 covering the open end of the boss. As is shown the pin 201 pierces the sheet 5 and extends into the hollow boss. Some clamping effect may be obtained as the pin 201 fits clampingly into the boss. The arrangement allows for an effective positioning and holding of the container 1.

The invention claimed is:
1. A substance dispensing system comprising, in combination:
 a disposable container filled with a portion of a substance, the disposable container having a deformable body with a bottom, a peripheral wall adjoining said bottom and having a top end remote from said bottom, an integral circumferential rim extending outwards from the top end of the peripheral wall and defining a filling opening of said disposable container, said disposable container being closed by a cover sheet which is sealed to the circumferential rim by means of a circumferential seal, and a dispensing apparatus comprising a compression device having a cover sheet side support member for the cover sheet side of the disposable container as well as a bottom engaging member for engaging on the bottom of the disposable container, said compression device being adapted to compress the disposable container by reduction of the distance between the cover sheet side support member and the bottom engaging member, the cover sheet side support member having a recess therein which is arranged and dimensioned so as extend across a section of the circumferential seal, so that upon compression of the initially closed disposable container the substance therein is pressurized causing the cover sheet to deform into the recess thereby breaking the circumferential seal at said section so that the substance is discharged from the disposable container, the dispensing apparatus including at least one water pump adapted to provide a portion of water to be dispensed, the compression device and the water pump being manually driven by a common manual driving device connected to both said compression device and said water pump, said manual driving device comprising:

a lever:

a first transmission connecting the lever to the compression device; and a second transmission connecting the lever to the water pump.

2. The system according to claim 1, wherein:

the water pump is a piston pump, and a single stroke of said piston pump provides the portion of water.

3. The system according to claim 1, wherein a water dispensing outlet is provided in the cover sheet side support member, in the vicinity of the recess.

4. The system according to claim 1, wherein the dispensing apparatus includes a cold water pump and a hot water pump, the cold water pump being associated with a cold water circuit and the hot water pump being associated with a hot water circuit.

5. The system according to claim 4, wherein:

the cold water pump and the hot water pump are manually operable pumps, and the common manual driving device is selectively engageable with either the hot water pump or the cold water pump.

6. The system according to claim 1, wherein the dispensing apparatus includes a cold water storage unit associated with a cooling device.

7. The system according to claim 6, further comprising a water storage container including a dispending connector for selectably connecting the water storage container to the dispensing apparatus.

8. The system according to claim 7, wherein the cold water storage unit comprises a receiving chamber for receiving the water storage container.

9. The system according to claim 7, further comprising a pressurized carbon dioxide vessel, and wherein the water storage container includes a carbonation connector for selectably connecting the carbon dioxide vessel to the water storage container.

10. The system according to claim 7, wherein the water storage container is adapted to contain pressurized carbonated water.

11. The system according to claim 10, wherein said carbonated water is at a pressure of at least 1.1 bar.

12. The system according to claim 10, wherein said water storage container includes:

a pressure resistant housing; and a collapsible bag inside said housing, said collapsible bag being in communication with the dispensing connector and adapted to receive the water.

13. The system according to claim 6, wherein:

the cold water storage unit includes a reservoir for storage of cold water, said system includes a user refillable water storage reservoir including a dispensing apparatus connector element, the dispensing apparatus includes a mating connector element for selectable connection to the connector element of said user refillable water storage reservoir, and said mating connector element of the dispensing apparatus is in communication with both the reservoir for storage of cold water and a hot water circuit.

14. The system according to claim 13, wherein the cold water storage unit is connected to both a cold water circuit and the hot water circuit.

15. The system according to claim 1, wherein said first transmission includes a link.

16. The system according to claim 1, wherein said second transmission includes a link.

17. The system according to claim 1, wherein the lever is connected to a pivot and is pivotable around said pivot.

18. The system according to claim 1, wherein the first transmission includes a gear.

19. The system according to claim 1, wherein the second transmission includes a gear.

* * * * *